Jan. 19, 1943.                M. H. GRAHAM                2,308,603
                              PRESSURE COOKER
                          Filed Feb. 7, 1941            2 Sheets-Sheet 1
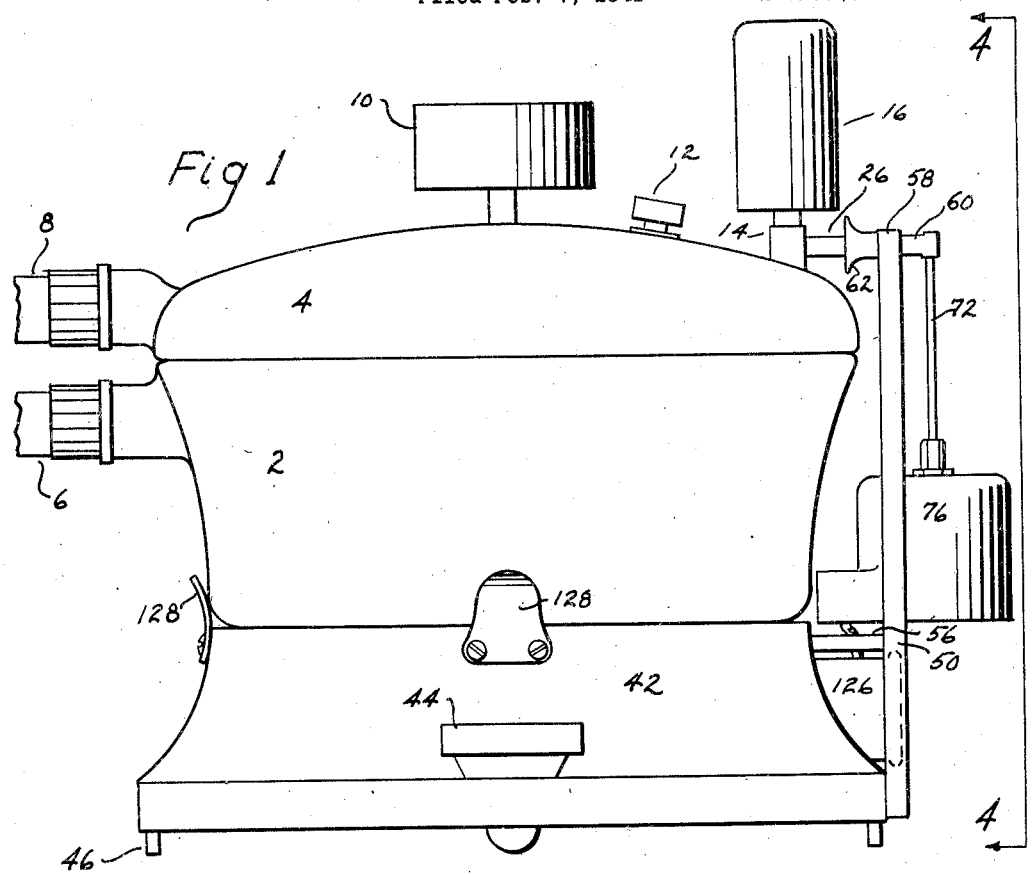
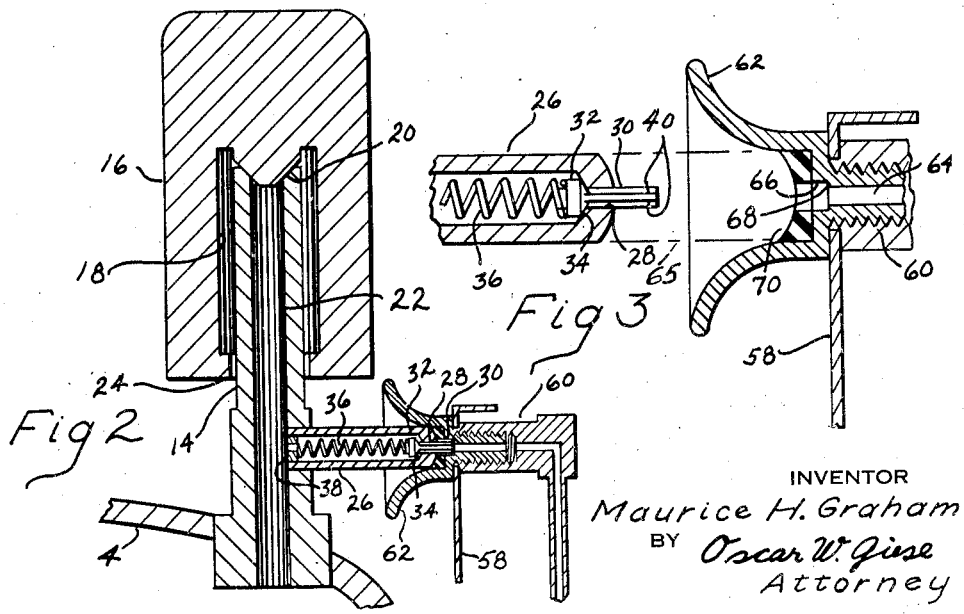
INVENTOR
Maurice H. Graham
BY Oscar W. Giese
   Attorney Jan. 19, 1943.    M. H. GRAHAM    2,308,603
PRESSURE COOKER
Filed Feb. 7, 1941    2 Sheets-Sheet 2
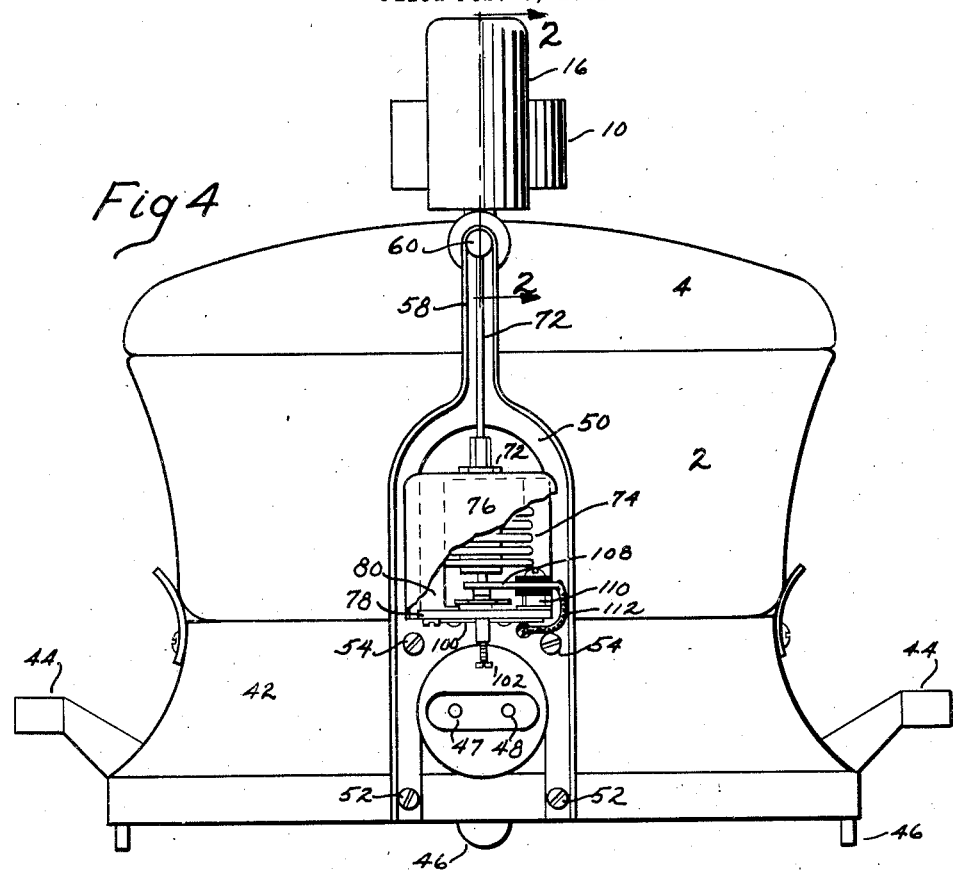
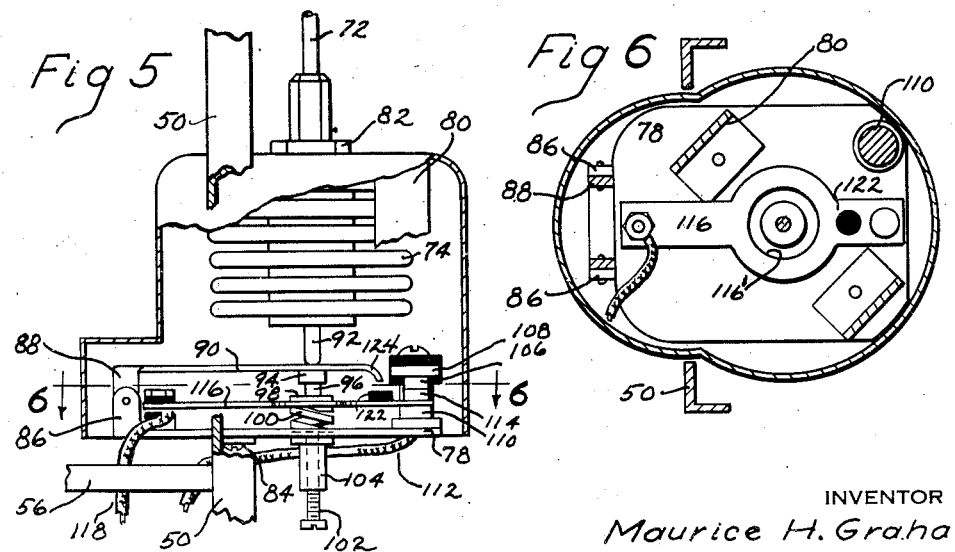
INVENTOR
Maurice H. Graham
BY Oscar W. Giese
Attorney Patented Jan. 19, 1943

2,308,603

UNITED STATES PATENT OFFICE 2,308,603

PRESSURE COOKER

Maurice H. Graham, St. Louis Park, Minn.

Application February 7, 1941, Serial No. 377,896

18 Claims. (Cl. 219—43)

The present device relates to new and useful improvements in pressure cookers and has for a broad object the automatic regulation of heat flow from a source of heat to a pressure cooker.

A further object of the invention is to provide an autmatic cut-out for the heating means of a pressure cooker which is operated in response to the pressure within the pressure cooker.

Another object of the invention is to provide means for automatically releasing the air from within the pressure cooker so that it will attain the proper temperature at a given pressure.

A still further object is to provide a pressure cooker which will operate economically, conserving heat through a minimum of steam escapage.

In the ordinary pressure cooker as is well known in the art, it is necessary for the user to watch the pressure gauge of the cooker so as to adjust the heating means and the rate of heat flow to the cooker. If too little heat is applied to the cooker, the pressure will not be adequate and if too much heat is applied, the pop-off valve will operate intermittently or constantly to relieve the excess pressure within the cooker. It is thus necessary for the user to watch the pressure cooker diligently to obviate improper cooking or uneconomical escape of steam. In the present device the pressure control maintains the proper cooking conditions within the cooker without wasting heat in the form of escaping steam.

Further, the presence of air in pressure cooking devices at the beginning of the heating operation has heretofore caused much trouble in attaining proper cooking conditions. The pressure cooker operates on the principle that an increase in pressure increases the boiling point of water and thereby raises the cooking temperature correspondingly. For example, saturated steam at a pressure of fifteen pounds per square inch has a temperature of about 249° Fahrenheit. It is to be observed, however, that the temperature and pressure stated correspond only in the case where the vapor phase comprises pure steam. Where air plus steam comprises the vapor phase the temperature will be much less, being approximately what the temperature of pure steam would be at the pressure equal to the fraction of the total pressure contributed by the steam alone in the air plus steam phase. Thus where a pressure of fifteen pounds per square inch above atmospheric pressure is maintained and the steam constitutes half the pressure and air the other half, the effective steam pressure is only 7.5 pounds per square inch. The corresponding temperature for saturated steam at 7.5 pounds pressure is about 234° Fahrenheit. Where the user of a pressure cooker is aware of this phenomenon it has been the practice for him to manually release the air from the cooker while pressure is building up or to overheat the cooker in order to cause the pop-off valve to release the air from the cooker. When the air is thus released from the cooker in the above example, the temperature will increase from 234° to 249° F., which latter temperature is the correct operating temperature for the cooker. In the present device the air release is an automatic function which accompanies every cooking operation and requires no special attention.

The present invention contemplates a pressure controlled source of heat operating at a predetermined pressure and a pop-off valve operating at another pressure slightly greater than that of the pressure control. During the initial heating operation there is a lag in the transfer of heat to the cooker and from the cooker to its contents due to the heat capacity of the device as a whole. For this reason the heat transfer to the cooker and its contents continues and the pressure increases even after the heater has been deenergized by the pressure control. The pop-off pressure in this initial heating operation is exceeded because of heat lag in the transmission of heat from the heater to the cooker, and the air is automatically expelled from the cooker. Now, however, since the device has reached an equilibrium between heat input and heat losses, the pressure control subsequently operates more nearly in accordance with fluctuations in temperature and the pop-off pressure is not again reached during that cooking operation. The single pop-off action, however, suffices to expel the air from the cooker.

In the drawings:

Figure 1 is a side elevation of the pressure cooker;

Figure 2 is a detailed view in vertical section on the lines 2—2 of Figure 4 showing the weight valve and the spring valve with the pressure cooker in operative position;

Figure 3 is an enlarged sectional view of the spring valve and the socket connection with the pressure cooker withdrawn from operative position;

Figure 4 is an elevation of the pressure cooker as viewed in the direction of the arrows 4—4 of Figure 1;

Figure 5 is a detailed side view of the pressure control mechanism as shown in Figure 1 with part cut away to show the construction; and Figure 6 is a horizontal section taken on the lines 6—6 of Figure 5.

Referring more particularly to the drawings, Figure 1 shows a pressure cooker comprising a container 2 with a cover 4. The container 2 is equipped with a handle 6 and the cover 4 is equipped with a handle 8. The cover 4 is secured to the container 2 by any means which will give a pressure-tight connection, preferably by means adapted to seal the cover upon slight rotational movement of the handle 8 with respect to the handle 6 so as to bring the handles 6 and 8 into alignment when the cover is sealed. At the center of the cover 4 is a steam pressure gauge 10 for indicating the pressure within the cooker and to aid in making adjustments on the pressure control device. A pop-off valve 12 is placed in the cover 4 to insure against accidental build-up of pressure. The pop-off valve may be of any type, for example a rubber cap device as shown in Figure 1, or a spring-controlled valve.

Also secured to the cover 4 and communicating with the inside of the pressure cooker is a second pop-off valve which preferably comprises a tubular stem member 14 which is secured at its base to an opening in the cover 4, and a weight member 16 disposed at the upper end of the stem member. The weight member 16 is cylindrically shaped and has a longitudinal bore 18, of a diameter larger than that of the tubular stem 14 so that the weight member may be placed over the stem as shown in Figure 2. At the end of the bore 18 and centrally disposed therein is a beveled projection 20 which fits partially into the end of the passageway 22 of the stem 14 and rests on a correspondingly beveled seat in the end of the stem 14 to form a tight connection therewith. An annular flanged portion 24 at the bottom of the weight member 16 fits loosely about the stem 14 and aids in maintaining the weight member 16 seated squarely on the end of the stem.

A tubular connecting member 26 communicates with the passageway 22 and extends out horizontally from stem 14. The tube 26 has a central opening 28 at its outer end of smaller dimension than the inside diameter of the tube. A valve member 30 with a beveled head 32 fits in the opening 28 and the head 32 is adapted to fit tightly against a correspondingly beveled seat 34 at the inside of the opening 28. A spring 36 is positioned against an annular bushing 38 at one end of the tube 26 and the head 32 at the other end and normally urges the valve to closed position to prevent the escape of steam from the pressure cooker. The valve 30, however, has longitudinal grooves 40, shown more particularly in Figure 3, which allows steam to pass through the opening 28 when the head 32 is not positioned against its seat 34 as shown in Figure 2.

The container 2 rests on a heater 42 which may be provided with suitable handles 44 and legs 46. The electric heating elements within the heater 42 are supplied with current from the terminals 47 and 48 and upon the closing of the pressure responsive switch to be described hereinafter.

A bifurcated bracket member 50 has its two legs secured to the heater 42 by means of screws 52 which extend directly through the base of the heater and screws 54 which extend into the horizontal supporting members 56.

The bracket member 50 has a central upward extension 58 which carries a short tube 60 into which is threaded a flared socket 62 which is adapted to receive the above described tubular connecting member 26.

The socket 62 has a central passageway 64 communicating with the interior of the tube 60 and thence with the pressure responsive device to be described hereinafter. The passageway 64 is counterbored at 66 for a short distance to receive the projecting end of the valve member 30. When the tubular connecting member 26 is in operative position, the shoulder 68 of the counterbore holds valve 30 in open position. Preferably an annular gasket 70 is positioned within the socket 62 so as to prevent leakage of steam passing from tube 26 into tube 60 and the pressure responsive device now to be described.

A communicating tube 72 depends from the tube 26 and at its lower end it is connected to a pressure responsive bellows 74 which is surrounded by a housing 76. A base plate 78 is secured in the bottom of the housing 76 by means of a U-shaped metal strap 80 through which passes the tube 72 and to which the housing is clamped by means of the nut 82. The base plate 78 is also secured to the bracket member 50 by means of screws 84, one of which appears in Figure 5.

The base plate 78 is provided at one edge with two upstanding ears 86 adapted to pivotally engage the depending ears of a cross-piece 88. An arm 90 extending laterally from the cross-piece is thus free to swing through a short arc about a horizontal axis.

The upper surface of the arm 90 is engaged by a thrust rod 92 projecting downwardly from the lower end of the bellows 74. The under side of the arm 90 is preferably provided with an abutment 94 against which a spring-pressed thrust rod 96 exerts an upward pressure. The rod 96 is provided with a flange 98 and a spring 100 is compressed between the flange 98 and the upper end of a set screw 102. The set screw 102 is threaded in a shank 104 extending downwardly from the base plate 78 and makes possible an adjustment of the compression exerted by the spring 100. Since the bias of the spring 100 opposes the expansion of the bellows 74, the adjustment of the set screw 102 thus determines the amount of pressure necessary to move the pivoted arm 90.

The switch for energizing and deenergizing the heater 42, includes a fixed contact 106 secured to the under side of a horizontal conducting arm 108 which is fastened to the post 110 and connects with the wire 112. The switch also includes a movable contact 114 which is secured to the end of a spring conductor 116 located beneath the movable arm 90 and connected to the wire 118. The spring conductor 116 is enlarged intermediate its ends and has an opening 116' through which members 96, 98 and 100 may move vertically, without establishing electrical contact therewith, as shown in Figure 6. The wires 112 and 118 are interposed between the heating element and the terminal 47. The other end of the heating element is connected to the terminal 48.

A non-conducting button 122 is fastened to the upper surface of the spring conductor 116 and is positioned to be engaged by the downwardly curved end 124 of the arm 90 whenever the bellows 74 expands and lowers the arm 90 sufficiently. Owing to the upward bias of the spring arm 116, the contacts 106 and 114 are closed except when the arm 90 is moved downwardly as just described.

As shown, the terminals 47 and 48 may desirably be surrounded by a cylindrical housing 126.

The heater 42 is preferably provided with upstanding guide members 128 which insures that the receptacle 2 will be accurately positioned on the heater when the device is in use.

In the operation of the device the user places the food to be cooked within the container 2, which may now be separate from the heater member, and places the desired amount of water with the food. The cover 4 is then placed on the container 2 and the handle 8 and the cover are given a slight rotational movement so as to bring the handles 8 and 6 into alignment and at the same time seal the cover. The container 2 and its cover are then placed on the electric heater 42 at the same time introducing the tube 26 into the socket 62. The container 2 fits snugly between the upstanding guide members 128 and the tube 26 is thus held in pressure-tight relation with the socket 62. The valve 30 enters the passageway 65 of the socket but engages the shoulder 68 unseating the valve head 32 against the action of spring 36. A communicating passageway is thus established between the interior of the cooker and the bellows 74 through the grooves 40 in the valve 30.

The terminals 47 and 48 are connected to a suitable source of electric power and the heater is energized through contacts 106 and 114 which are now in closed relation as in Figure 5. As the contents of the cooker are heated, pressure builds up within and is transmitted to the bellows 74 which begins to expand. At a predetermined cut-off pressure, for example, fifteen pounds per square inch, the bellows will have moved arm 98 downwardly sufficiently to break the contacts 106, 114. On breaking the contact the electric heater is deenergized but due to the fact that the heating took place from room temperature, there is a lag in the transmission of heat to the cooker and the pressure will continue to build up on the override of heat. The override will carry the pressure several pounds over the cut-off pressure, to say eighteen pounds per square inch.

The pop-off valve 16 is preferably of such weight and the cross-section of the passageway 22 of such area that a pressure of about three pounds per square inch in excess of the predetermined bellows cut-off pressure will raise the pop-off valve 16 and allow vapor to escape into the atmosphere until the pressure of the cooker falls back below eighteen pounds per square inch. The air present with the steam vapor escapes from the cooker when the pop-off valve 16 is raised by the initial override of heat. Since only pure steam vapor remains the proper temperature henceforth is maintained in accordance with the pressure of the steam in the cooker.

Once the pressure cooker is heated, an equilibrium is established between the heat input and the heat losses. The next and subsequent times the bellows breaks the contacts 106, 114 the override of heat is, therefore, not sufficient to raise the pressure to eighteen pounds per square inch and the pop-off valve will remain closed during the remainder of the operation.

The pressure cooker may be removed from the heater at any time whether or not there is pressure within the cooker. If there is pressure within the cooker the valve 30 will seal the opening in the tube 26 to prevent sudden release of the pressure from the cooker and consequent "puffing" of the food by generation of steam within the cell structure thereof. Likewise the pressure cooker may be used without the pressure control by merely setting the cooker on the heater so that the tube 26 does not enter the socket 62, or the cooker may even be used separately with any other source of heat.

It is to be understood that the invention is not limited to the particular embodiment herein disclosed. One may, for example, employ in connection with the pressure control a source of heat other than electricity without departing from the spirit of the invention.

I claim as my invention:

1. In a pressure cooking device, a closed container, a heater for the container, a vent valve responsive to pressure within the container adapted to remain closed during initial heating of the container to a predetermined pressure and becoming momentarily operative at said predetermined pressure to vent air trapped in the container, and means responsive to the pressure within the container for regulating the heater operative after said venting of air from the container to maintain the pressure within the container below the predetermined pressure at which the vent valve becomes operative.

2. In a pressure cooking device, a closed container, a heater for the container, a vent valve responsive to pressure within the container adapted to remain closed during initial heating of the container to a first predetermined pressure and becoming momentarily operative at said first predetermined pressure to vent air trapped in the container, and means responsive to the pressure within the container for regulating the heater operative after said venting of air from the container to maintain the pressure within the container below said first predetermined pressure at which the vent valve becomes operative, said heater control means being operative when the container pressure exceeds a second predetermined pressure, lower than said first predetermined pressure, to decrease the amount of heat applied to the container, and being operative when the container pressure falls below said second predetermined pressure to increase the amount of heat applied to the container.

3. In a pressure cooking device a closed container, a heater for the container, means responsive to the pressure within the container for increasing the output of the heater when the pressure in the container is less than a first predetermined pressure and for decreasing the output of the heater when the pressure exceeds the first predetermined pressure and a valve operable to allow the escape of air and steam from the container at a second predetermined pressure which is higher than the first predetermined pressure and attainable as the result of the initial heating action of the heater upon the container.

4. In a pressure cooking device a closed container, a heater for the container, pressure-responsive means for controlling the heater to normally maintain a first predetermined pressure in the container and a relief valve operable to release air and steam at a pressure higher than the first predetermined pressure and attainable as the result of the initial heating action upon the container.

5. In a pressure cooking device a closed container, a heater for the container, pressure-responsive means for controlling the heater to normally maintain a first predetermined pressure in the container and a relief valve operable to release air and steam at a pressure approximately three pounds higher than the first predetermined pressure.

6. In a pressure cooking device a closed container, an electric heater for the container, pressure-responsive means including a bellows-operated circuit breaker to normally maintain a first predetermined pressure in the container and a weighted pop-off valve operable to release air and steam at a second predetermined pressure higher than the first predetermined pressure and attainable as the result of the initial heating action upon the container.

7. In a pressure cooking device of the class including a closed container, a heater, a support for the heater removably mounting the container, and pressure-responsive means on the support for controlling the heater; the improvement which comprises fluid pressure conducting means rendered operative through the mounting of the container in operative position upon the said support to provide a detachable fluid pressure connection between the interior of the container and the pressure-responsive means.

8. In a pressure cooking device of the class including a closed container, a heater, a support for the heater removably mounting the container, and pressure-responsive means on the support for controlling the heater; the improvement which comprises fluid pressure conducting means leading from the container, adapted to be detachably connected with the pressure-responsive control means through the mounting of the container in operative position upon the support, and adapted to be detached from the pressure-responsive control means through the removal of the container from the support, and means rendered operative to seal said fluid pressure conducting means against the escape of fluid pressure from the container when said conducting means is detached from the pressure-responsive control means upon removal of the container from the support.

9. In a pressure cooking device of the class including a closed container, a heater for the container, a support for the container and for the heater from which the container is removable, pressure-responsive means mounted on said support for controlling the heater; the improvement which comprises a tubular passageway leading from said container and another tubular passageway leading from said pressure control device, the ends of said tubular passageways being detachably joined together through bringing the container into operative position on said support and means provided on the said support whereby the said container is detachably fastened on the said support in such a manner as to hold the said tubular passageways detachably secured in joined relationship.

10. In a pressure cooking device of the type comprising a closed container, a heater for the container, a support for the container and for the heater from which the container is removable, pressure-responsive means mounted on said support for controlling the heater; the improvement which comprises a tubular passageway leading from said container and another tubular passageway leading from said pressure control device, the end of one of said passageways being flared outwardly to form a socket in which the end of the other passageway is detachably received through bringing the container into operative position on said support and means provided on the said support whereby the said container is fastened in such a manner as to hold the said end of the other passageway securely in the said socket.

11. In a pressure cooking device of the type comprising a closed container, a heater for the container, a support for the container and for the heater, pressure-responsive means mounted on said support for controlling the heater; the improvement which comprises a rigid tubular passageway leading from said container and another rigid tubular passageway leading from said pressure control device, the end of one of said passageways being flared outwardly to form a socket adapted to receive the end of the other passageway when the container is in operative position on said support, and guide members on said support for maintaining the connection between the passageways.

12. In a pressure cooking device of the type comprising a closed container, a heater for the container, a support for the container and for the heater, pressure-responsive means mounted on said support for controlling the heater; the improvement comprising a first tubular passageway leading from said container, and another tubular passageway leading from said pressure control device, means for preventing the escape of vapor through the first passageway when the ends of said passageways are not connected together and means for connecting the ends of said passageways together when the container is in operative position on said support and for permitting the flow of vapor from the first passageway into the second passageway.

13. In a pressure cooking device of the class including a closed container, a heater for the container, means responsive to the pressure within the container for decreasing the output of the heater when the pressure exceeds a predetermined pressure; characterized by the fact that there is combined with the said means a valve arranged in such a manner as to allow the escape of air and steam from the container at a pressure above the predetermined pressure aforesaid and within the increase pressure range obtainable as the result of the override of heat from the initial action of the said heater upon the said container.

14. In a pressure cooking device of the class including a closed container, a support for the container and for the heater, pressure responsive means mounted on the said support for controlling the heater; the improvement which comprises a rigid tubular member projecting vertically from the said support, the said tubular member connected at the lower end to the said pressure responsive means, and the upper end of the said tubular member extending laterally, a second rigid tubular member projecting laterally from the said container, the said second tubular member having one end connected to the said container, an outwardly flared socket connected at one of the ends of the said tubular members, an annular resilient member positioned within the said socket and adapted to fit against an end of the other tubular member in such a manner as to permit the flow of vapor from the said container through the said tubular members to the pressure responsive means aforesaid, and means adapted to position the said container upon the said support in such a manner as to detachably secure the end of the other said tubular member within the said socket tightly against the said resilient member.

15. In a pressure cooking device of the class including a closed container, a heater for the container, a support for the container and for the heater, pressure-responsive means mounted on said support for controlling the heater; the improvement which comprises a tubular passageway leading from the said container and another tubular passageway leading from said pressure control device, a valve member slidably mounted within one of the said tubular passageways, the said valve member adapted to operably close the said tubular passageway, and the said valve member having formed therein longitudinal grooves adapted to permit a flow of steam through the said tubular passageway when the said tubular passageway is connected with the other tubular passageway in such a manner as to slidably actuate the said valve so as to open the said tubular passageway.

16. In a pressure cooking device of the class including a closed container comprising a main section and a cover section removably secured to the main section, a heater for the main section and pressure-responsive means for controlling the heater; the improvement which comprises fluid pressure conducting means carried by the removable container cover section adapted to be rendered operative through operatively mounting the cover section on the main container section to provide a detachable fluid pressure connection between the interior of the container and the pressure-responsive control means.

17. In a pressure cooking device of the class including a closed container comprising a main section and a cover section removably secured to the main section, a heater for the main container section and pressure-responsive control means for the heater; the improvement which comprises fluid conducting means carried by the removable cover section for transmitting fluid pressure from the interior of the container to the pressure-responsive control means, and detachable fluid coupling means adapted to automatically connect said fluid pressure conducting means to the pressure-responsive control means through bringing the removable cover section into operative position on the main container section and to automatically break the connection between said fluid pressure conducting means and said pressure-responsive control means through removal of the cover section from the main container section.

18. In a pressure cooking device of the class including a supporting base, a closed container mounted on the supporting base, a heater for the container and pressure-responsive means for controlling the heater, both mounted on the supporting base, the container including a removable cover section independent of the supporting base; the improvement which comprises a tubular passageway leading from the interior of the container and carried by the removable cover section, and another tubular passageway leading from the pressure-responsive control means, said tubular passageways having coacting end portions adapted to be detachably joined through applying the cover section to the container on the supporting base.

MAURICE H. GRAHAM.